(12) United States Patent
Singh et al.

(10) Patent No.: US 12,073,809 B2
(45) Date of Patent: Aug. 27, 2024

(54) SYSTEMS AND METHODS FOR ACCOMMODATING COLOR VISION DEFICIENCY IN FINANCIAL TRANSACTION MESSAGES

(71) Applicant: Mastercard International Incorporated, Purchase, NY (US)

(72) Inventors: Sachin Kumar Singh, Pune (IN); Rajeev Kumar, Pune (IN); Kumar Abhinav, Pune (IN)

(73) Assignee: Mastercard International Incorporated, Purchase, NY (US)

( * ) Notice: Subject to any disclaimer, the term of this patent is extended or adjusted under 35 U.S.C. 154(b) by 70 days.

(21) Appl. No.: 18/154,185

(22) Filed: Jan. 13, 2023

(65) Prior Publication Data

US 2024/0242693 A1     Jul. 18, 2024

(51) Int. Cl.
*G09G 5/02* (2006.01)
*G06F 40/109* (2020.01)

(52) U.S. Cl.
CPC ............ *G09G 5/02* (2013.01); *G06F 40/109* (2020.01); *G09G 2320/0666* (2013.01)

(58) Field of Classification Search
CPC . G09G 5/02; G09G 2320/0666; G06F 40/109
See application file for complete search history.

(56) References Cited

U.S. PATENT DOCUMENTS

| | | | | |
|---|---|---|---|---|
| 7,124,375 | B1* | 10/2006 | Steele | G09G 5/024 |
| | | | | 345/589 |
| 11,798,244 | B1* | 10/2023 | Witchey | G06Q 20/3825 |
| 2012/0246079 | A1* | 9/2012 | Wilson | G06Q 20/3226 |
| | | | | 705/67 |
| 2022/0148483 | A1* | 5/2022 | Azam | G09G 5/06 |
| 2023/0007085 | A1* | 1/2023 | Berliner | G06F 3/04815 |
| 2023/0063562 | A1* | 3/2023 | Maiman | G06Q 30/0201 |
| 2023/0169299 | A1* | 6/2023 | Vadrevu | G06K 19/07747 |
| | | | | 235/492 |

\* cited by examiner

*Primary Examiner* — Kenneth B Lee, Jr.
(74) *Attorney, Agent, or Firm* — Hovey Williams LLP

(57) ABSTRACT

A method for adapting text message communications in electronic financial transactions to accommodate users with color vision deficiency. During a registration process, a primary account number, a selection of an enrollment in a color vision deficiency accommodation service, a selection of a preferred critical text color, and an electronic device identifier are received from a user. During a subsequent electronic card present transaction process, the primary account number and the electronic device identifier are received from the user via a payment gateway webpage. During an adaptation process, a text of a message containing a critical text element communicated to the user regarding the transaction is adapted by presenting the critical text element in the preferred critical text color previously selected by the user. The message may be adapted within a template, or the message may be dynamically adapted by searching the message and identifying the critical text element.

20 Claims, 5 Drawing Sheets

SYSTEMS AND METHODS FOR ACCOMMODATING COLOR VISION DEFICIENCY IN FINANCIAL TRANSACTION MESSAGES

FIELD

The present invention relates to system and methods for facilitating electronic financial transactions, and more particularly, embodiments concern a system and method for accommodating color vision deficiency in financial transaction messages by allowing individual users to register as color vision deficient and select a preferred critical text color for use in such messages.

BACKGROUND

Color vision deficiency (CVD), or color blindness, is the decreased ability to see color or differences in color. Red-green color blindness is the most common form, followed by blue-yellow color blindness and total color blindness. Important hyperlinks added to two-factor authentication short message service (SMS) messages or emails and other important text may be displayed or highlighted in certain colors to attract attention and convey information about the nature of the text. Similarly, in ecommerce financial transactions a payment gateway page may use certain colors to display or highlight certain key informational elements such as a bad card message or a time-boxed transaction to enter a one-time password within a set time period. For example, important text may be displayed in red to attract the attention of a user, and informational text may be displayed in green. However, the use of standardized colors in such communications fails to fulfill its purpose for CVD individuals who cannot see or distinguish those particular colors.

This background discussion is intended to provide information related to the present invention which is not necessarily prior art.

SUMMARY

Embodiments address the above-described problems and limitations by providing a system and method for improving communications in financial transactions by accommodating CVD in financial transaction messages by allowing individual users to register as CVD and select one or more a preferred critical text colors and then displaying or highlighting certain critical text using the preferred colors in text messages to that individual. In doing so, embodiments advantageously make the financial transaction experience more accessible and more user friendly to persons with CVD.

In an embodiment of the present invention, a method may be provided for adapting text message communications in electronic financial transactions to accommodate users with CVD. During a registration process, a primary account number (PAN), a selection of an enrollment in a CVD service, and a selection of a preferred critical text color may be received from a user. During a subsequent electronic financial transaction, the PAN may be received from the user, and the PAN may be used to determine that the user selected the enrollment in the CVD service. During an adaptation process, a text of a message containing a critical text element communicated to the user regarding the electronic financial transaction may be adapted by presenting the critical text element in the preferred critical text color previously selected by the user.

In various implementations of the above-described embodiment, the method may additionally or alternatively include any one or more of the following features. The method may include further receiving from the user during the registration process an electronic device identifier (ID) for an electronic device, and subsequently receiving from the user during the financial transaction the electronic device ID for the electronic device. The method may include further receiving from the user during the registration process a transaction amount limit and a selection of a preferred authentication mechanism. The method may further include sending an authentication request to the user prior to completing the registration process requiring the user to confirm selection of enrollment in the CVD service, wherein the authentication request may be sent to the user using the preferred authentication mechanism previously selected by the user. The method may include further receiving from the user during the registration process a merchant category code (MCC). The method may further include receiving from the user a selection of a preferred typographical emphasis such as bold, underline, and italic, and adapting the text of the message containing the critical text element communicated to the user by also presenting the critical text element in the preferred typographical emphasis selected by the user.

The electronic financial transaction may be an ecommerce card present electronic financial transaction. The PAN may be received from the user via a payment gateway webpage during the electronic financial transaction. The message may be sent to the user using a technology selected from the group consisting of email and SMS. The message may have a form such as information messages, error messages, warning messages, hyperlinks, and timers. The form of the message may have a template, and the method may further include receiving the template and inserting the message into the template before adapting the message. Additionally or alternatively, the message may be dynamically adapted during execution by software that searches the message and identifies the critical text element.

In another embodiment of the present invention, a method may be provided for adapting text message communications in electronic financial transactions to accommodate users with CVD. During a registration process, a PAN, a selection of an enrollment in a color vision deficiency accommodation service, a selection of a preferred critical text color, an electronic device ID for an electronic device, and a selection of a preferred authentication mechanism may be received from a user. During a subsequent ecommerce card present electronic financial transaction, the PAN and the electronic device ID may be received from the user via a payment gateway webpage, and the PAN may be used to determine that the user selected the enrollment in the CVD service. During an adaptation process, a text of a message containing a critical text element communicated to the user regarding the ecommerce card present electronic financial transaction may be adapted by presenting the critical text element in the preferred critical text color selected by the user. The message may be sent to the user using a technology such as email and SMS, the message may have a form such as information messages, error messages, warning messages, hyperlinks, and timers, the form of the message may have a template, and the method may further include receiving the template and inserting the message into the template before adapting the message.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein.

Figure 1:
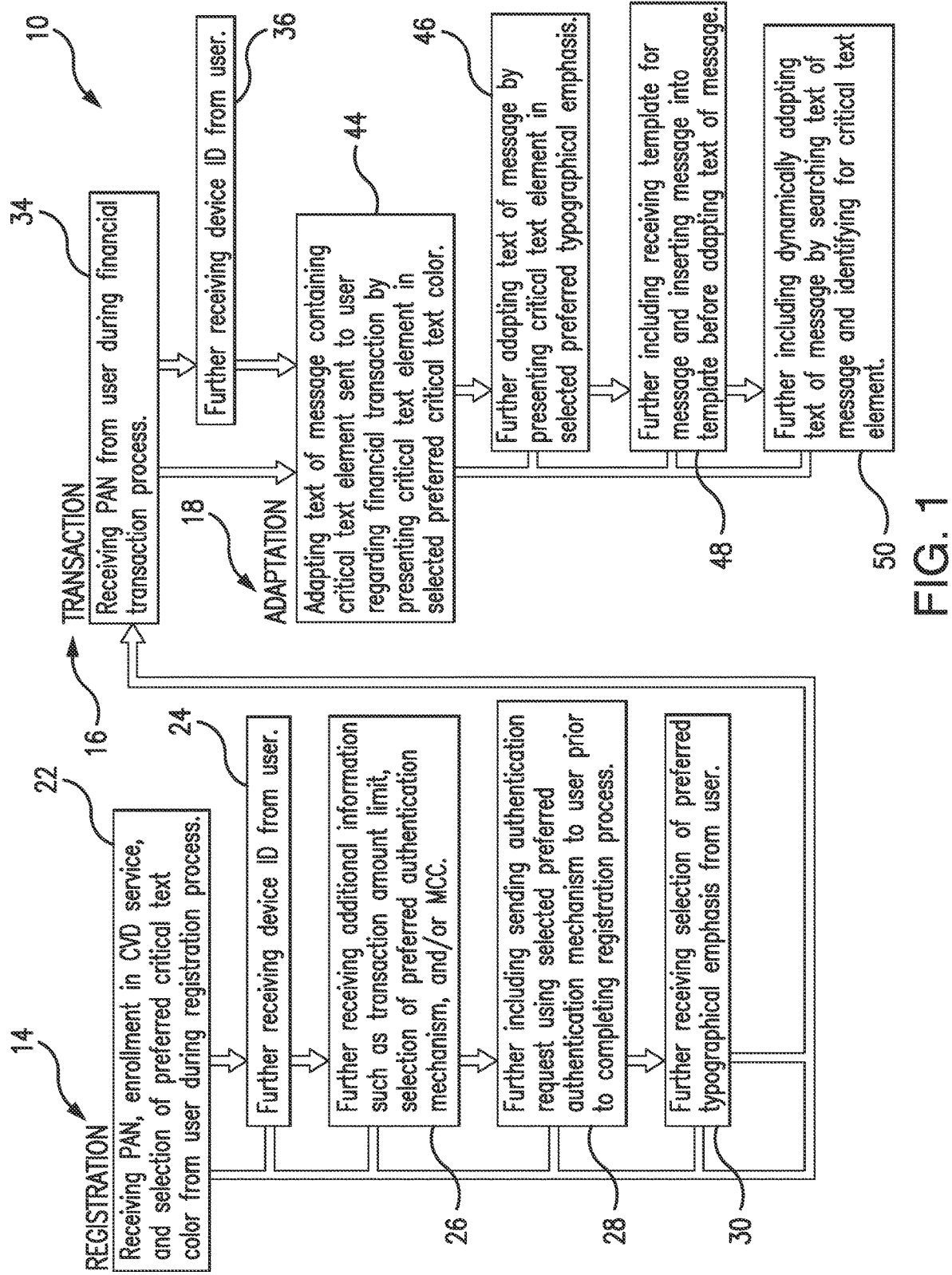
FIG. 1 is a flowchart of steps in an embodiment of a method for adapting text message communications in electronic financial transactions to accommodate users with CVD.
Figure 2:
FIG. 2 is an example text message which might be sent during a financial transaction and which contains a critical text element, wherein such a text message might be the focus of the method of FIG. 1.
Figure 3:
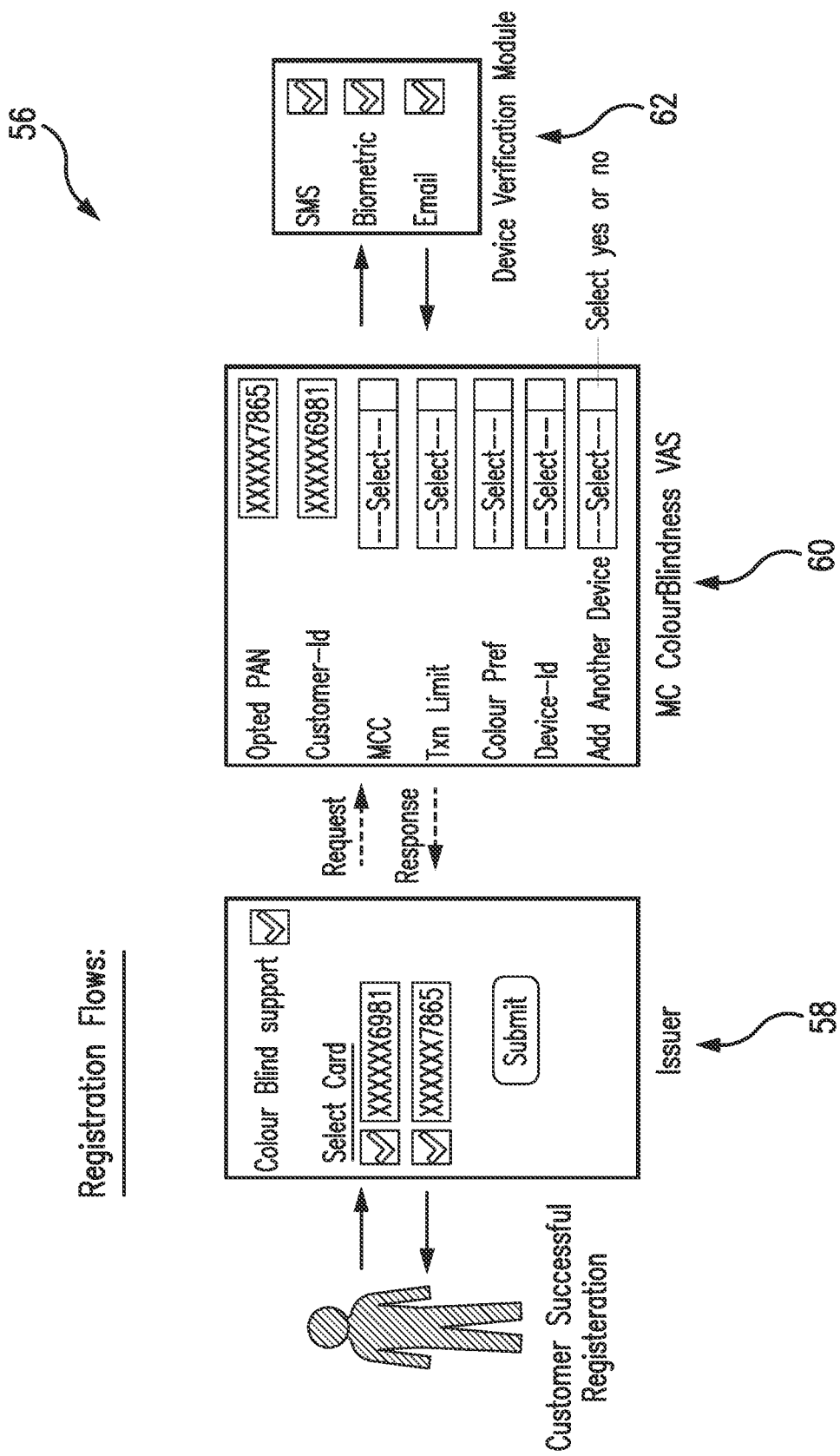
FIG. 3 is a block diagram of an example registration flow of a registration process component of the method of FIG. 1.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present invention can include a variety of combinations and/or integrations of the embodiments described herein.

Broadly, embodiments provide a method for improving communications in financial transactions by accommodating CVD in financial transaction messages by allowing individual users to register as CVD and select one or more a preferred critical text colors and then displaying or highlighting certain critical text using the preferred colors in text messages to that individual. In doing so, embodiments advantageously make financial transaction experiences more accessible and more user friendly to persons with CVD.

Referring to FIGS. 1-5, an embodiment of a method 10 of adapting text message communications in electronic financial transactions (e.g., ecommerce card present transactions) may include a registration process 14, a transaction process 16, and an adaptation process 18, along with the following steps.

During the registration process 14, relevant user and other information, such as a PAN, a selection of an enrollment in a CVD service and a selection of a preferred critical text color may be received from a user, as shown in 22. In one implementation, the registration process 14 may further include receiving from the user an electronic device ID for an electronic device, as shown in 24. In one implementation, the registration process 14 may further include receiving from the user substantially any suitable additional relevant registration information such as a transaction amount limit, a selection of a preferred authentication mechanism, and/or an MCC, as shown in 26. Relatedly, the method may further include sending an authentication request to the user prior to completing the registration process 14 requiring the user to confirm selection of enrollment in the color vision deficiency accommodation service, wherein the authentication request is sent to the user using the preferred authentication mechanism selected by the user, as shown in 28. In one implementation, the registration process 14 may further include receiving from the user a selection of a preferred typographical emphasis such as bold, underline, and/or italic, as shown in 30.

During the subsequent electronic financial transaction process 16, the PAN may be received from the user, and the PAN may be used to determine that the user previously selected the enrollment in the CVD service, as shown in 34. This and any other information may be received from the user via a payment gateway webpage during the electronic financial transaction. In one implementation, the transaction process 16 may further include receiving from the user the electronic device ID for the electronic device, as shown in 36, if one was provided during the registration process.

During the adaptation process 18, a text of a message 38 (shown in FIG. 2) containing a critical text element 40 communicated to the user regarding the electronic financial transaction may be adapted by presenting the critical text element 40 in the preferred critical text color previously selected by the user, as shown in step 44. In one implementation, the adaptation process 18 may further include adapting the text of the message 38 containing the critical text element 40 communicated to the user may include presenting the critical text element 40 in the preferred typographical emphasis selected by the user, as shown in 46, if one was provided during the registration process.

The message 38 may be sent to the user using substantially any suitable technology such as email and SMS, and the message 38 and/or the critical text element 40 may have substantially any suitable form such as information messages, error messages, warning messages, hyperlinks, and timers. In one implementation, the message 38 may have a template, and the method 10 may further include receiving the template and inserting the message 38 into the template before adapting the message 38, as shown in 48. In another implementation, the message 38 may be dynamically during execution (or during runtime or in near real-time) adapted by software that searches the message 38 and identifies the critical text element 40, as shown in 50.

Referring again to FIGS. 1-5, in an example implementation, the method 10 may proceed substantially as follows. Referring particularly to an example registration flow 54 shown in FIG. 3, the user may register with an issuer 56 (e.g., a bank or payment card service) of a payment card. During the registration process 14, the user may enroll in the CVD accommodation service and may enter or otherwise provide and/or the issuer may capture various information 60 such as a PAN, a customer ID, an electronic device ID for an electronic device (e.g., smartphone, tablet, laptop); an MCC; one or more preferred colors; a transaction amount limit; and/or an authentication mechanism (e.g., email, SMS, biometric). Because there are different kinds of color blindness, the user choses the critical color(s) that work form them. In one implementation, the user may also be allowed to choose to bold, underline, or otherwise further distinguish critical text. The user may be allowed to provide multiple device IDs for different electronic devices.

Prior to completion of the registration process 14, an authentication request may be sent to the user by a device verification module 62 requesting that the user electronically confirm that they wish to be enrolled in the CVD accommodation service. The issuer 58 may create a corresponding electronic token against the PAN and/or device ID indicating that the CVD accommodation service is enabled for the PAN and/or device ID. In one implementation, the CVD accommodation service may be based on the PAN and accessed on any electronic device, and in another implementation, the service may be based on the PAN but only accessed on an electronic device with a registered device ID.

Figure 4:
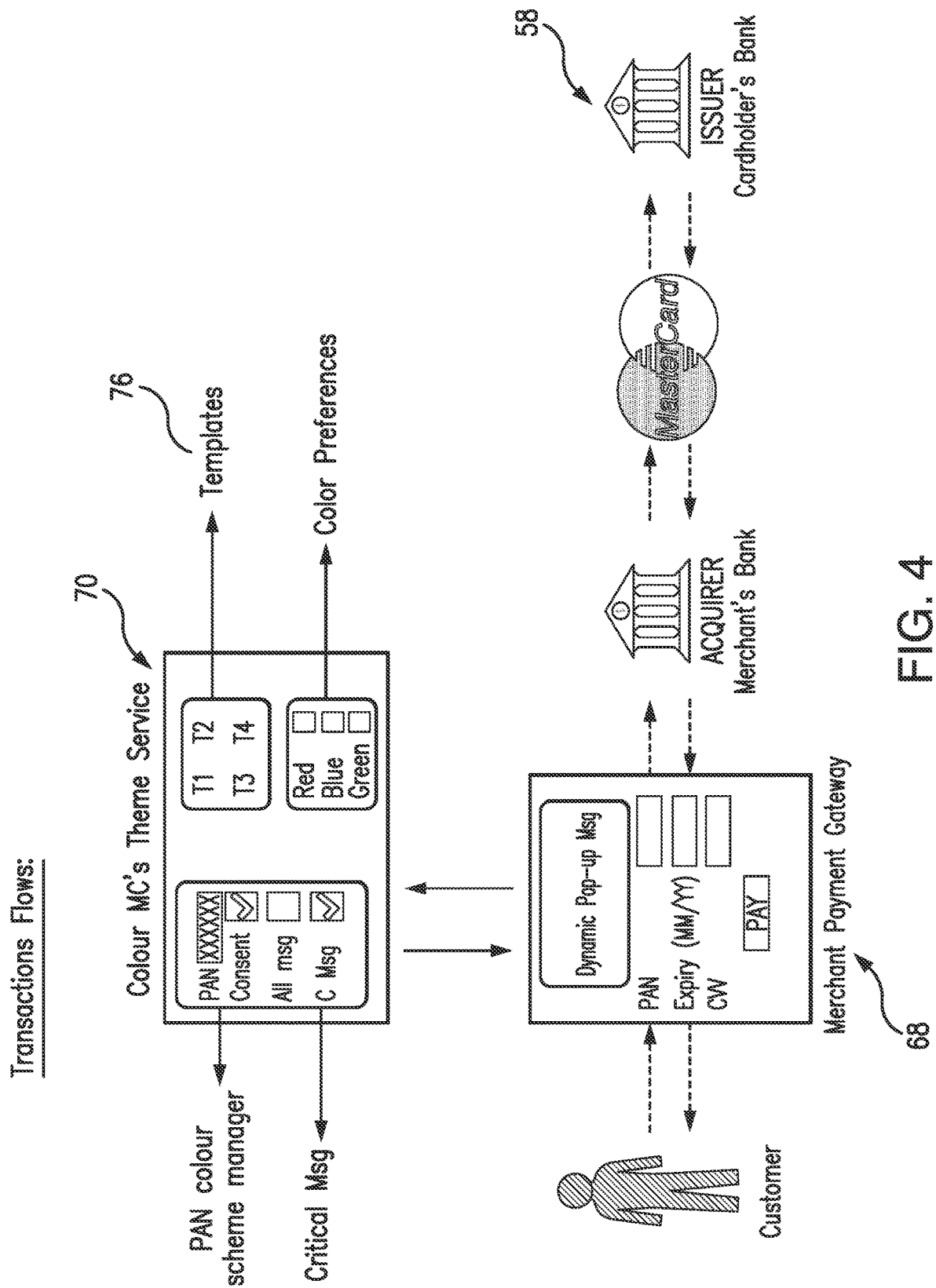
FIG. 4 is a block diagram of an example transaction flow of a transaction process component of the method of FIG. 1.
Figure 5:
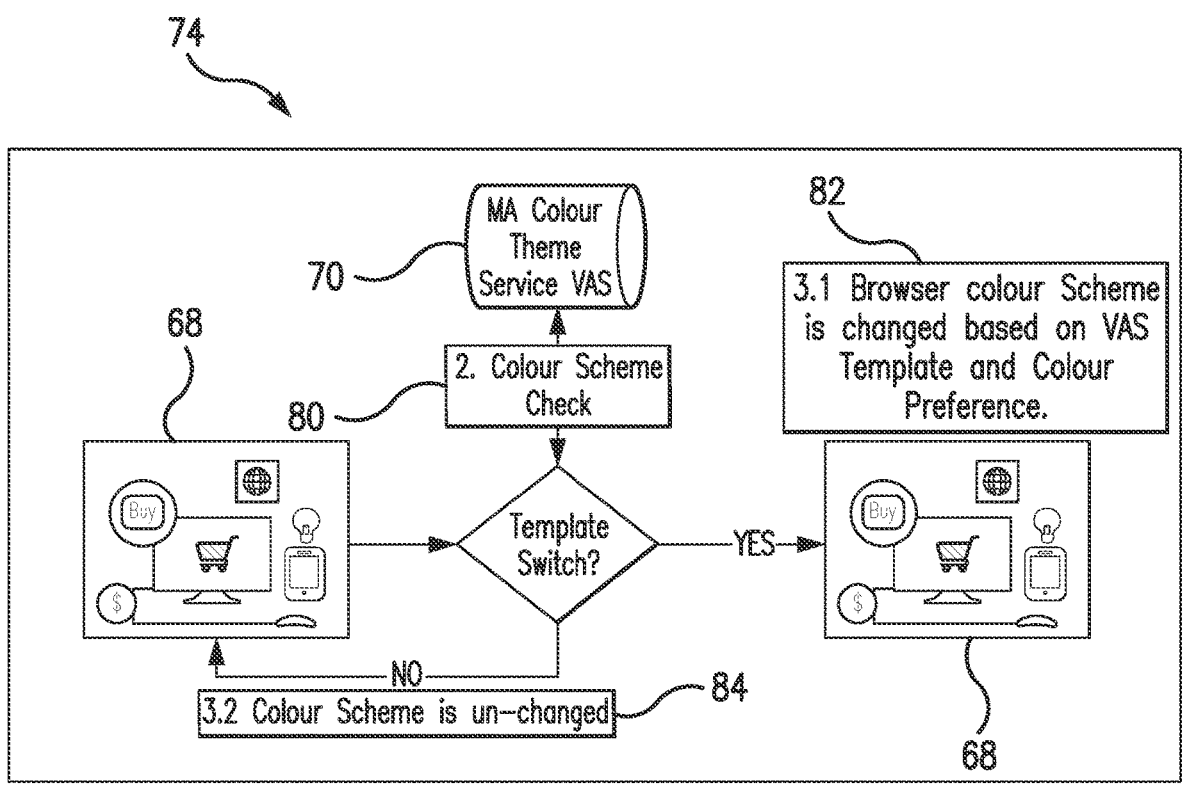
FIG. 5 is a block diagram of an example template version of an adaptation process component of the method of FIG. 1.

Referring particularly to an example transaction flow 66 shown in FIG. 4, subsequent to registration, the user may initiate an electronic financial transaction (e.g., an ecommerce card present transaction) with the issuer 58. During the transaction process 16, the user enters the PAN and/or the device ID into a payment gateway page 68. The CVD accommodation service 70 may check the PAN and/or the device ID to determine whether the user is enrolled in the service. If the user is enrolled, the CVD accommodation service 70 may ensure that the user's preferred critical color(s) are used to display or highlight critical text 40 in the text messages 38. Referring particularly to FIG. 5, in an example template version 74 of the adaptation process 18, the CVD accommodation service 70 may accomplish accommodation through various templates 76 for the different types of text messages (e.g. a one-time password (OTP) template, a resend OTP template, a time remaining template). In more detail, each kind of message (e.g., error, information, warning) has a different template, and when the PAN and/or device ID is entered into gateway page 68, it is checked to determine whether the user is enrolled in the CVD accommodation service, as shown in 80. If the user is enrolled, then the service 70 acts to adapt the critical elements 40 of any message 38 that might be sent during the transaction, as shown in 82. If the user is not enrolled (or, in on implementation, the particular device ID has not been provided), standard colors are used for critical text elements 40, as shown in 84. An example template schema for a OTP message may be as follows:

Template T1{
"name": "OTP_info",
"theme_name": "default",
"theme_color": "#2980b9",
"theme_msg": "default",
"theme_support_merchant_url": "https:\\support.myntra.com\",
"theme_support_pg": "razorpay"
}

An example template schema for a resend OTP message may be as follows:

Template T2{
"name": "Error_info",
"theme_name": "default",
"theme_color": "#6340z1",
"theme_msg": "default",
"theme_link": "true",
"theme_support_merchant_url": "https:\\support.myntra.com\",
"theme_support_pg": "razorpay"

In another implementation, the CVD accommodation service 70 may employ the preferred critical color(s) dynamically. In more detail, software (using, e.g., javascript or cascading style sheets (CSS)) may read each message, identify any critical elements, capture the positions of any critical element, and changes only the critical elements to the user-preferred colors.

In one implementation, with the user's consent the information may be transmitted by the issuer to the merchant in a tokenized format along with credential on file (COF) tokens for future transactions. In one implementation, the CVD accommodation service 70 function may be implemented as a cloud service. In another implementation, the CVD accommodation service 70 function may be embedded in the payment gateway page to make it real-time and seamless. In more detail, based on the entered PAN and/or device ID, the software may make an application programming interface (API) call to the CVD accommodation service 70 to determine whether a color preference exists, and if so, downloads any needed templates and makes changes in real-time to messages as they come in.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A method of adapting text message communications in electronic financial transactions to accommodate users with color vision deficiency, the method comprising:
   receiving from a user during a registration process a primary account number, a selection of an enrollment in a color vision deficiency accommodation service and a selection of a preferred critical text color;
   receiving from the user during an electronic financial transaction the primary account number, and using the primary account number to determine that the user selected the enrollment in the color vision deficiency accommodation service; and
   adapting a text of a message containing a critical text element communicated to the user regarding the electronic financial transaction by presenting the critical text element in the preferred critical text color previously selected by the user.

2. The method of claim 1, further including—
   receiving from the user during the registration process an electronic device identifier for an electronic device; and
   receiving from the user during the electronic financial transaction the electronic device identifier for the electronic device.

3. The method of claim 1, further receiving from the user during the registration process a transaction amount limit and a selection of a preferred authentication mechanism.

4. The method of claim 3, further including sending an authentication request to the user prior to completing the registration process requiring the user to confirm selection of the enrollment in the color vision deficiency accommodation service, wherein the authentication request is sent to the user using the preferred authentication mechanism previously selected by the user.

5. The method of claim 1, further receiving from the user during the registration process a merchant category code.

6. The method of claim 1, further including—
receiving from the user during the registration process a selection of a preferred typographical emphasis selected form the group consisting of: bold, underline, and italic; and
adapting the text of the message containing the critical text element communicated to the user by also presenting the critical text element in the preferred typographical emphasis selected by the user.

7. The method of claim 1, wherein the electronic financial transaction is an ecommerce card present electronic financial transaction.

8. The method of claim 1, wherein the primary account number is received from the user via a payment gateway webpage during the electronic financial transaction.

9. The method of claim 1, wherein the message is sent to the user using a technology selected from the group consisting of: email and short message service.

10. The method of claim 1, wherein the message has a form selected from the group consisting of: information messages, error messages, warning messages, hyperlinks, and timers.

11. The method of claim 10, wherein the form of the message has a template, and the method further includes receiving the template and inserting the message into the template before adapting the message.

12. The method of claim 1, wherein the message is dynamically adapted during execution by software that searches the message and identifies the critical text element.

13. A method of adapting text message communications in electronic financial transactions to accommodate users with color vision deficiency, the method comprising:
receiving from a user during a registration process a primary account number, a selection of an enrollment in a color vision deficiency accommodation service, a selection of a preferred critical text color, and an electronic device identifier for an electronic device;
receiving from the user during an electronic financial transaction the primary account number and the electronic device identifier, and using the primary account number to determine that the user selected the enrollment in the color vision deficiency accommodation service; and
adapting a text of a message containing a critical text element communicated to the user regarding the electronic financial transaction by presenting the critical text element in the preferred critical text color previously selected by the user.

14. The method of claim 13, further including—
receiving from the user during the registration process a selection of a preferred authentication mechanism; and
sending an authentication request to the electronic device prior to completing the registration process requiring the user to confirm selection of enrollment in the color vision deficiency accommodation service, wherein the authentication request is sent to the user using the preferred authentication mechanism previously selected by the user.

15. The method of claim 13, further including—
receiving from the user during the registration process a selection of a preferred typographical emphasis selected form the group consisting of: bold, underline, and italic; and
adapting the text of the message containing the critical text element communicated to the user by also presenting the critical text element in the preferred typographical emphasis selected by the user.

16. The method of claim 13, wherein the electronic financial transaction is an ecommerce card present electronic financial transaction, and the primary account number is received from the user via a payment gateway webpage during the electronic financial transaction.

17. The method of claim 13, wherein the message is sent to the user using a technology selected from the group consisting of: email and short message service, and the message has a form selected from the group consisting of: information messages, error messages, warning messages, hyperlinks, and timers.

18. The method of claim 17, wherein the form of the message has a template, and the method further includes receiving the template and inserting the message into the template before adapting the message.

19. The method of claim 13, wherein the message is dynamically adapted during execution by software that searches the message and identifies the critical text element.

20. A method of adapting text message communications in electronic financial transactions to accommodate users with color vision deficiency, the method comprising:
receiving from a user during a registration process a primary account number, a selection of an enrollment in a color vision deficiency accommodation service, a selection of a preferred critical text color, an electronic device identifier for an electronic device, and a selection of a preferred authentication mechanism;
receiving from the user via a payment gateway webpage during an ecommerce card present electronic financial transaction the primary account number and the electronic device identifier, and using the primary account number to determine that the user selected the enrollment in the color vision deficiency accommodation service; and
adapting a text of a message containing a critical text element communicated to the user regarding the ecommerce card present electronic financial transaction by presenting the critical text element in the preferred critical text color previously selected by the user,
wherein the message is sent to the user using a technology selected from the group consisting of: email and short message service, the message has a form selected from the group consisting of: information messages, error messages, warning messages, hyperlinks, and timers, and the form of the message has a template, and the method further includes receiving the template and inserting the message into the template before adapting the message.

* * * * *